A. SIMON.
MOTOR CONTROLLER.
APPLICATION FILED JAN. 2, 1915.

1,307,836.

Patented June 24, 1919.
4 SHEETS—SHEET 1.

Witnesses
J. L. Johnson
Tekla Bast

Inventor
Arthur Simon
By Frank A. Hubbard
Attorney

A. SIMON.
MOTOR CONTROLLER.
APPLICATION FILED JAN. 2, 1915.

1,307,836.

Patented June 24, 1919.
4 SHEETS—SHEET 2.

Witnesses
J. L. Johnson
Lelia Bast

Inventor
Arthur Simon
By Frank H. Hubbard
Attorney

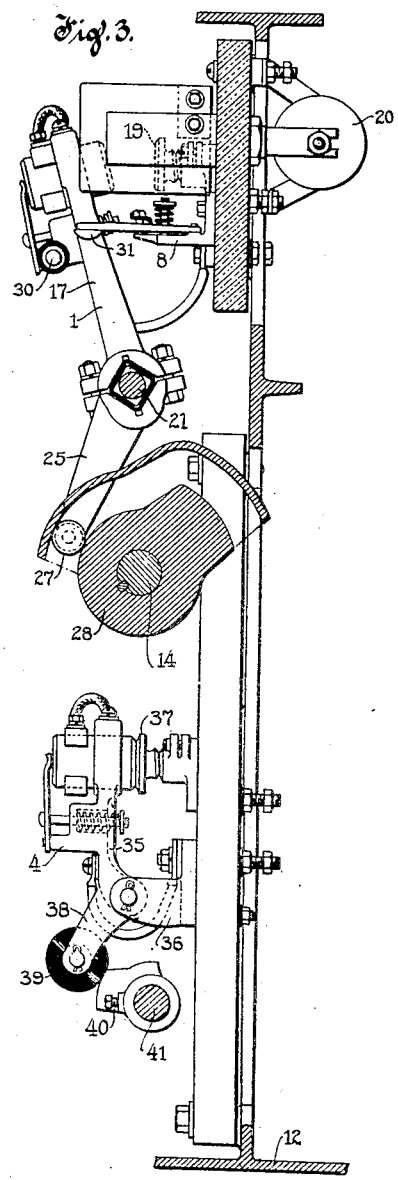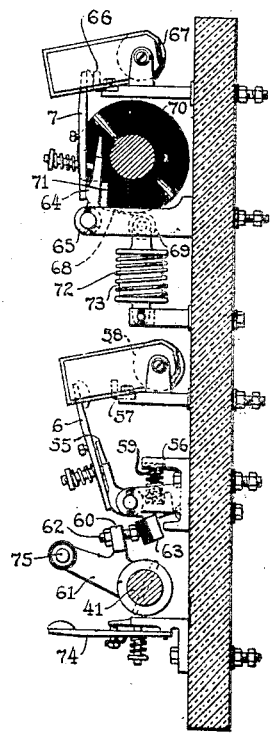

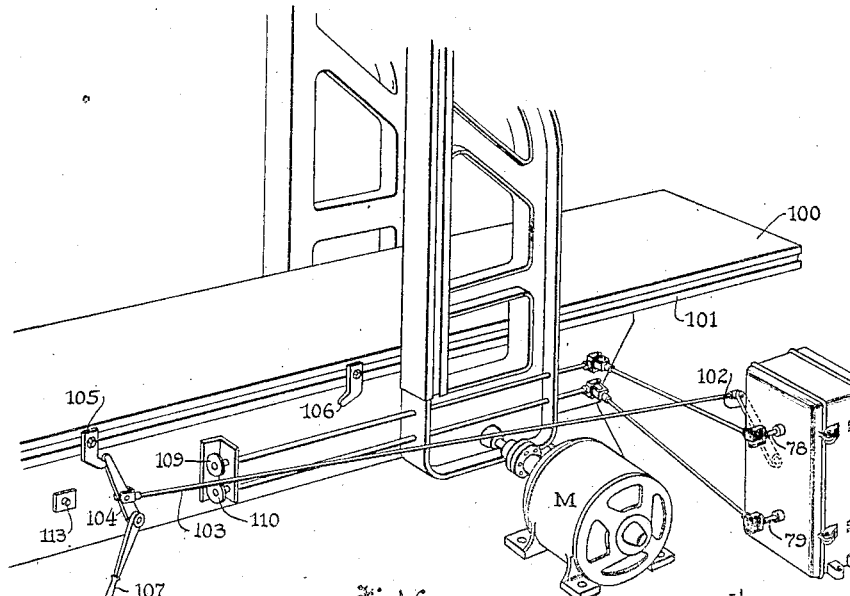

UNITED STATES PATENT OFFICE.

ARTHUR SIMON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,307,836.      Specification of Letters Patent.    Patented June 24, 1919.

Application filed January 2, 1915. Serial No. 229.

*To all whom it may concern:*

Be it known that I, ARTHUR SIMON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to controllers for electric motors of standard and special types, and the present embodiment thereof is designed particularly for a planing machine operated by a special type of motor.

One of the objects of the invention is to provide a special form of motor having characteristics particularly adapting the same to planer service with a controller governed by the planer to effect the desired control of said motor automatically and in a reliable and efficient manner.

Other objects and advantages of the invention, irrespective of the class of machinery with which the same is used, include the provision of improved means for establishing different speeds upon reverse operations of the motor, for plugging the motor upon reversals to different degrees according to its speed when subjected to reversal and for controlling the flow of current through the shunt field winding of the motor to reduce the same when the motor is idle and to restore the same to a predetermined value when the motor is started.

Still further objects and advantages will appear hereinafter in connection with the following description of the embodiment of the invention illustrated in the accompanying drawings.

In the accompanying drawings,

Fig. 3 is a sectional view on line 3—3, Fig. 1;

Fig. 4 is a sectional view on line 4—4, Fig. 1;

Fig. 5 is a schematic view of a planer machine with the controller associated therewith; and, Fig. 6 is a diagrammatic view showing the controller connected to the planer motor.

Figure 1:
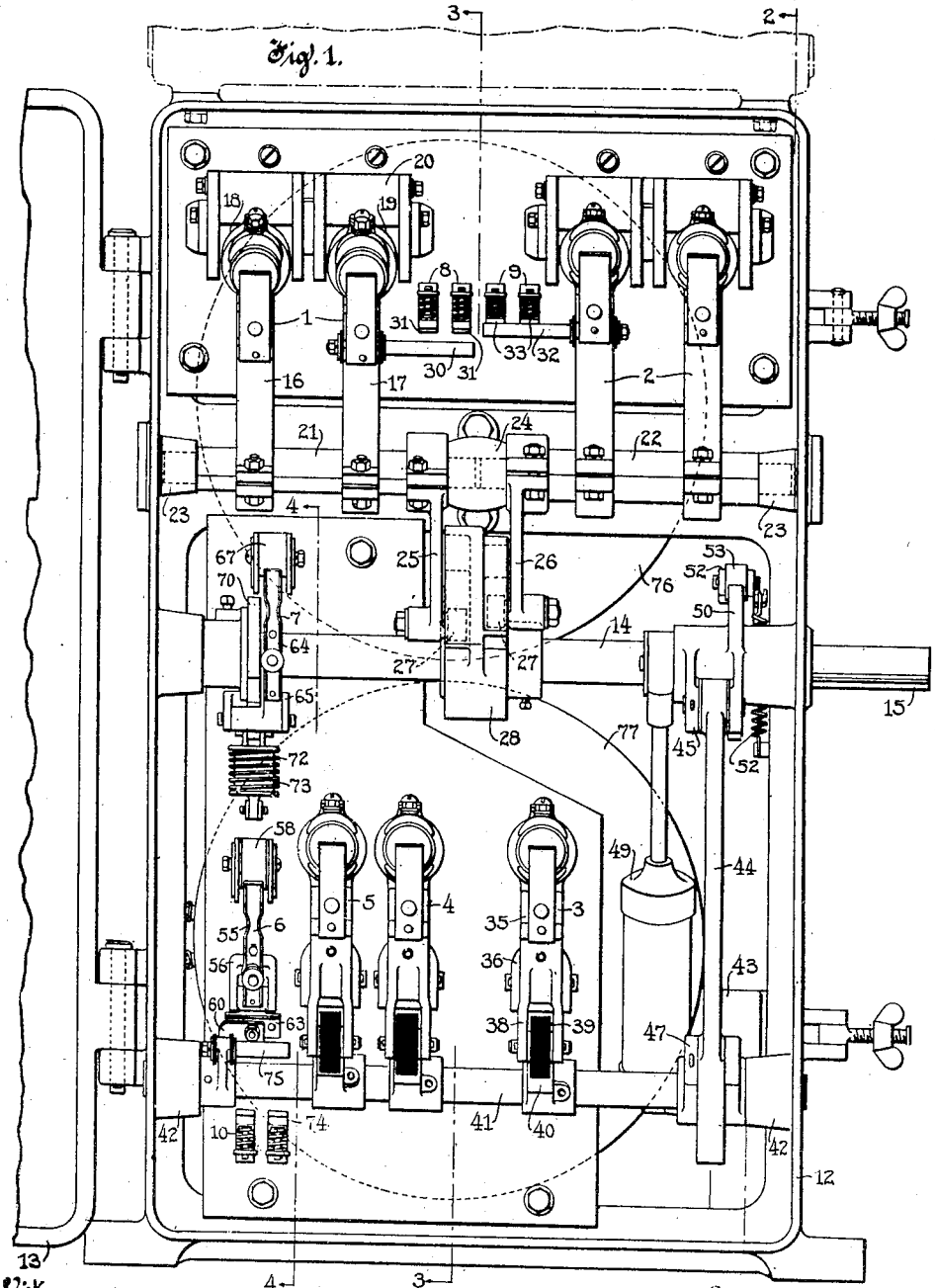
Figure 1 is a front elevation of the controller.

Referring to the controller as illustrated in Figs. 1 to 4, the same includes two double-pole reversing switches 1 and 2, progressively operated accelerating switches 3, 4 and 5, a shunt field weakening switch 6 acting subsequently to the accelerating switches and a second switch 7 to act upon the shunt field to reduce the flow of current therethrough when the motor is idle and to insure full field strength when the motor is started. Also, the controller includes auxiliary switches 8 and 9 associated with the reversing switches 1 and 2 respectively and an auxiliary switch 10 associated with the accelerating switches. As will hereinafter appear, separate field rheostats are provided for regulating the speed of the motor for forward and reverse operations and the auxiliary switches 8 and 9 constitute selectors for these rheostats. Auxiliary switch 10 is provided for interlocking purposes, as hereinafter set forth. All of the aforesaid switches are supported within a protecting casing 12 having a hinged door 13 to give access thereto and all of said switches are operable or controllable by a master shaft 14 extending transversely between the reversing and accelerating switches and revolubly supported in the walls of the casing to be turned by an extension 15 projecting through the right hand wall of the casing.

The reversing switches are of the same construction, each comprising two arms 16 and 17 of conventional form, to engage stationary contacts 18 and 19 respectively, the latter being mounted upon a suitable panel and having suitable blowout devices 20 associated therewith. The arms of the reversing switch 1 are fixed to a rectangular shaft 21 while the arms of the reversing switch 2 are fixed to a similar shaft 22 in axial alinement with the shaft 21 but revoluble independently thereof. Each shaft has a bearing 23 in a wall of the casing and the two shafts having a common bearing 24 on a cross bar within the casing. On opposite sides of this common bearing arms 25 and 26 are fixed to the shafts 21 and 22 respectively and said arms are provided at their extremities with rollers 27 projecting into grooves of a cam 28 fixed to the master shaft 14. The construction of the cam 28 is apparent from Figs. 2 and 3 and is such as to alternately actuate the arms 25 and 26 and accordingly the switches 1 and 2 upon reverse operations of the shaft 14. More specifically, in a centered position of the shaft 14 both switches are opened, whereas movement of the shaft in one direction from such position effects closure of one switch and movement of the shaft in the opposite direction effects opening of the closed switch and closure of the other. In this connection it will be noted that the walls of the grooves in the cam act upon the rollers 27 and in consequence upon the arms 25 and 26 to positively move the switches 1 and 2 both into and out of engagement with their stationary contacts.

The auxiliary switch 8 comprises a stud 30 projecting laterally from the arm 17 of reversing switch 1 to engage and bridge contact fingers 31 when the switch 1 is closed. When the switch 1 is open the stud 30 disengages the contact fingers 31. The auxiliary switch 9 is of similar construction, having a stud 32 on the arm 16 of reversing switch 2 and coöperating contact fingers 33. In Fig. 1 the switch 1 is shown open and in consequence the stud 30 is disengaged from the fingers 31, whereas switch 2 is shown closed and in consequence stud 32 is engaged with fingers 33.

The accelerating switches 3, 4 and 5 are of conventional form, each including a switch arm 35 pivotally mounted upon a bracket 36 fixed to a second panel and a coöperating stationary contact 37 also fixed to such panel. Each lever (Fig. 3) is provided with an extension 38 carrying a fiber roller 39 and the rollers of the several levers engage cams 40 fixed to a transverse shaft 41 having bearings 42 in opposite walls of the casing. The cams 40 are of such construction and arrangement as to provide for closure of the switches 3, 4 and 5 progressively in the order named. As will be understood, the switches 3, 4 and 5 tend to stand in open position and in consequence reverse rotation of the shaft 41 will effect opening thereof. The operation of the shaft 41 to close the switches 3, 4 and 5 is effected by a weighted lever 43 (Fig. 2) fixed to said shaft and having an operative connection with the master shaft 14. This connection includes a link 44 pivoted at one end to an arm 45 fixed to shaft 14 and having at its opposite end a lost motion connection 46 with an extension 47 of the weighted lever 43. As will be apparent, the link 44 and arm 45 on the shaft 14 form a toggle between said shaft and the weighted lever whereby when the toggle is straightened the weight will be lifted, thereby turning the shaft 41 to open the accelerating switches, whereas when the toggle is broken the weight is permitted to descend to close the accelerating switches against the action of a dash-pot 49 suitably connected therewith. The straightening of the toggle occurs as the shaft 14 is returned from either extreme position to its centered position and conversely the toggle is broken upon movement of the shaft from its centered position to either of its extreme positions. Accordingly it will be apparent that there is a definite relation between the operation of the reversing switches and the accelerating switches, in that the latter are positively opened upon movement of the master shaft to open the reversing switches and are automatically closed by the weight following the operation of the master shaft to close either reversing switch. For accentuating the three positions of the master shaft, the latter is provided with a notched segment 50 with which coöperates a pawl 51 having a tensioning spring 52 and a roller 53 to enter the notches in the segment 50 under the tension of said spring.

The field control switch 6 (Fig. 4) includes a contact arm 55 of conventional form supported by a bracket 56 fixed to the lower panel and is movable to engage a stationary contact 57 having associated therewith a blowout device 58. The contact arm 55 is biased toward the contact 57 by a spring 59 seated in the bracket 56 and is adapted to be disengaged from contact 57 by a lug 60 on the shaft 41. This lug comprises a projection from the arm 61 fixed to the shaft and carries an adjusting screw 62 to abut an extension 63 on the lever 55. The arrangement is such that the arm 55 engages contact 57 when the weight acting on the shaft 41 is lifted and is withdrawn from said contact, through the engagement of the parts just described, when the weight descends to rotate the shaft to close the accelerating switches.

The second field switch 7 comprises a contact arm 64 pivotally supported by a bracket 65 and coöperating with a stationary contact 66 having associated therewith a blowout device 67. This switch arm has a bell crank extension 68 provided at its extremity with a roller 69 engaging a fiber cam 70 fixed to the master shaft 14. The cam 70 engages the roller 69 to positively hold the switch arm 64 in engagement with contact 66 in all positions of the master shaft except its centered position when the roller 69 enters a notch 71 in the cam 70 to permit the switch arm 64 to disengage contact 66. The arm 64 is biased outwardly and away from the contact 66 by a spring pressure device 72 and within the device 72 is arranged a dash-pot 73 to retard movement of the arm under the influence of said device. In the operation of the controller this switch opens in the centered position of the master shaft, which represents the off position of the controller as a whole, to reduce the flow of current through the shunt field of the motor for purposes of economy and is closed upon initial movement of the master shaft to strengthen the shunt field of the motor for starting. In practice, however, it is preferred not to have the switch open as the master shaft is rotated from one extreme position to the other for quick reversal of the motor, and the dash-pot 72 is provided to restrain the switch against opening under such conditions.

The interlocking switch 10 (Figs. 1 and 3) comprises two contact fingers 74 mounted upon the lower panel and a bridging member 75, in the form of a stud, projecting from the arm 61 on the shaft 41. The arrangement is such that the stud 75 bridges fingers 74 in the centered position of the shaft 41 representing the off position of the controller, and disengages said fingers immediately upon movement of shaft 41 from centered position. As will hereinafter be more fully set forth, the switch 10 is in circuit with an electromagnetic switch or circuit-breaker in the motor circuit and functions to necessitate return of the controller above described to off position in order to reset said switch or circuit breaker after tripping thereof while the controller is in running position.

Figure 2:
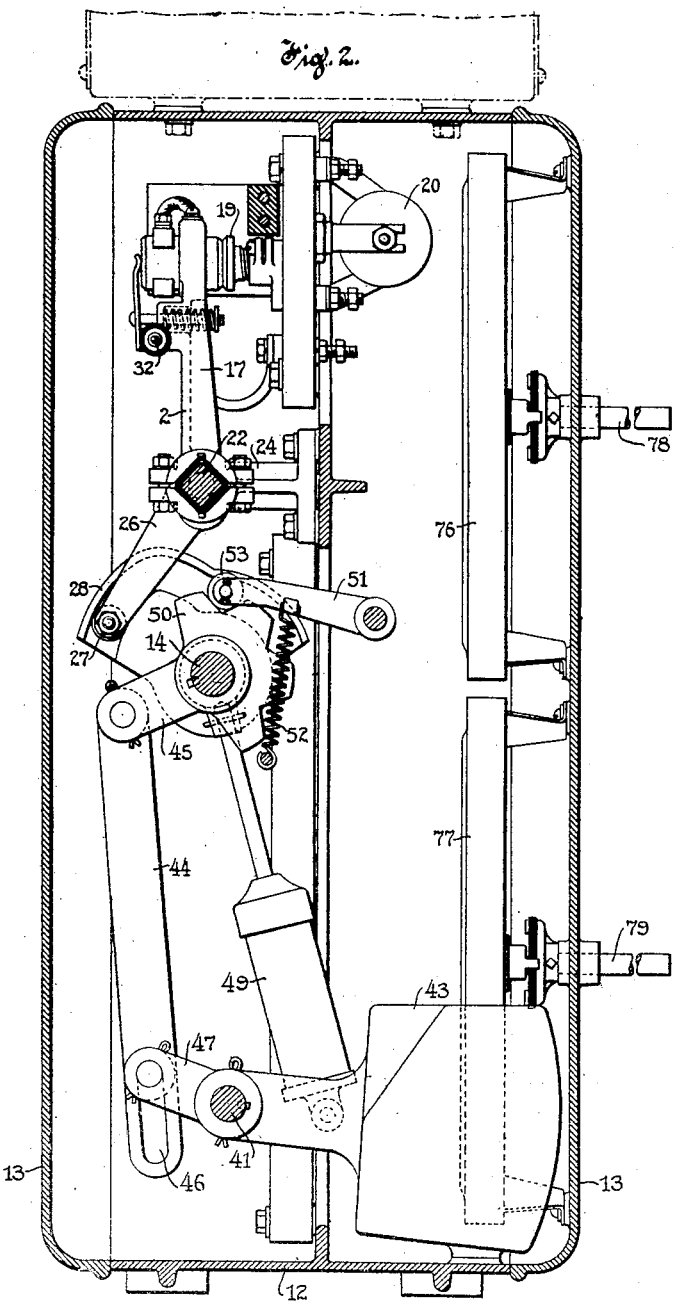
Fig. 2 is a sectional view on line 2—2, Fig. 1.

As above stated, two field rheostats are provided to regulate the speed of the motor for forward and reverse operations and these rheostats are illustrated in Fig. 2. The two rheostats 76 and 77 are shown in side elevation and as secured within the casing 12 to the rear of the mechanism above described. These rheostats may be of any preferred construction and accordingly the details thereof have not been illustrated. The rheostat 76 has, however, been illustrated as provided with an operating shaft 78 extending through the rear wall of the casing while the rheostat 77 has been illustrated as provided with a similar operating shaft 79.

Referring now to Fig. 5, the controller is illustrated in outline connection with a planer 100 operated by a motor M, the controller being adapted to govern the motor M and to be automatically operated by the reciprocating bed 101 of the planer. The master shaft of the controller is provided with a lever 102 connected by a link 103 to a lever 104 mounted upon the planer frame and projecting into the path of lugs 105 and 106 on the planer bed. As will be understood, the arrangement is such that reverse movements of the planer bed will, through the connections described, throw the master shaft of the controller back and forth between its extreme positions and in consequence effect selective operation of the reversing switches 1 and 2 and automatic operation of the other switches in the manner above set forth. The lever 104 of the planer mechanism is also provided with an operating handle 107 whereby the controller may be manually operated at will, as well as automatically by the planer. Further, the planer has mounted thereon in proximity to the handle 107 two hand wheels 109 and 110 operatively connected, through suitable means, to the operating shafts 78 and 79 respectively of the field rheostats. The rheostats may thus be readily adjusted at will by the hand wheels 109 and 110. Still further, the planer has mounted thereon in proximity to the control elements above mentioned, a push-button switch 113 to control the aforesaid magnetic switch or circuit-breaker in the motor circuit.

Referring now to Fig. 6, the motor M is of a special type and is diagrammatically illustrated as provided with an armature $a$, a series field winding $f$, an interpole field winding $f'$, a commutating field winding $F^2$ and a shunt field winding $f^3$. This type of motor has been selected because the characteristics thereof particularly adapt the same to planer service and such characteristics will be readily appreciated by those skilled in the art. In Fig. 6 is also diagrammatically illustrated a double-pole electromagnetic switch 114 to serve as the aforesaid circuit-breaker. This switch has two sets of stationary contacts 115 and 116, the former to be engaged thereby to complete the motor circuit and the latter to be engaged thereby to establish dynamic braking connections, as will later be explained. The reversing switches, accelerating switches, field rheostats and the remaining switches above described are also diagrammatically illustrated in this figure, and the accelerating switches 3 and 4 are shown as controlling resistances $r$ and $r'$ respectively.

In general, the controller operates and functions as follows: With the master shaft of the controller in centered position and the switch or circuit-breaker 114 deënergized the motor is disconnected from circuit and the flow of current through the shunt field winding of the motor is restricted by the entire resistance of rheostats 76 and 77. To start the motor it is necessary to first energize the switch or circuit-breaker by the push button 113 and then move the master shaft of the controller in one direction or the other by the handle 107. This effects closure of one or the other of the reversing switches, thereby completing the motor circuit through one or both of the resistances $r$ and $r'$ and at the same time closes switch 7 to short-circuit the field rheostats 76 and 77 through the switch 6. Further, the aforesaid operation of the master shaft releases the weight attached to the shaft 41, which thereupon rotates said shaft against the action of the dash-pot, to at once open the interlocking switch 10 in the energizing circuit of switch 114 and thereafter progressively close switches 3, 4 and 5 and open the switch 6. Switch 3 in closing excludes from the motor circuit the resistance $r$, switch 4 short-circuits the resistance $r'$, if previously included in the motor circuit, and switch 5 short-circuits the commutating field $f^2$ of the motor. Switch 6 when operated opens the short-circuit around the field rheostats and then effects inclusion of the rheostat preselected by the auxiliary switches 8, 9 associated with the reversing switches, the preselection being effected by short-circuiting of the rheostat provided for the reverse operation. Thus the motor is automatically accelerated to the desired speed, which may be predetermined by the adjustment of the field rheostat, and subsequently varied at will by further adjustment of the rheostat. When the motor has operated to move the planer bed to its limit in the selected direction, then said planer bed, through one of the lugs thereon, actuates the lever 104 to throw the master shaft of the controller to its opposite extreme position. This effects return of the parts of the mechanical controller to off position and then effects operation of the other reversing switch and automatic operation of the remaining switches in the manner already described with the result of reversing the motor and automatically accelerating the same to the speed predetermined by the field rheostat selected by the reversing switch. To stop the motor it is only necessary for the operator to move the handle 107 to center the master shaft and thereby restore the mechanical controller to off position. If, during operation of the motor there should be a failure of power, then the switch 114 would be deënergized to disconnect the motor from circuit and close the aforesaid dynamic braking circuit, whereby the motor would be quickly brought to rest. Following such a failure of power the switch 114 would be rendered ineffective to reclose the motor circuit until the mechanical controller was first restored to off position to thereby close the interlocking switch 10, which, as above set forth, is included in the energizing circuit of said switch.

The circuit connections will now be more specifically described, it being assumed that current is supplied from lines L and L'. To energize switch 114 the push button switch 113 is depressed to close circuit from line L through said push-button switch, by conductor 120 through interlocking switch 10, by conductor 121 through the magnet 114$^a$ of switch 114, by conductor 122 to line L'. Switch 114 thereupon responds and after responding is maintained energized independently of the push-button switch and interlocking switch by a circuit extending directly thereto from line L through a resistance $r^2$. The resistance $r^2$, it will be understood, is of sufficient value to prevent the current flowing therethrough to effect response of switch 114 when open.

Assuming that the mechanical controller is operated to close reversing switch 1, circuit will be completed from line L through the right hand arm of switch 114, by conductor 125 through the series field winding $f$ of the motor, by conductor 126 through the left hand arm of switch 114, by conductor 127 through the resistance $r$, by conductors 128 and 129 through the right hand arm of switch 1, by conductor 130 through the commutating field $f^2$, by conductor 131 through the armature $a$, by conductor 132 through the interpole field $f'$, by conductors 133 and 134 through the left hand arm of switch 1, by conductors 135 and 136 to line L'. This, it will be observed, completes circuit through the motor and includes resistance $r$. Also, upon operation of the controller as aforesaid the shunt field circuit of the motor extends from conductor 125 by conductor 137 through winding $f^3$, by conductors 138 and 139 through switch 6, by conductor 140 through switch 7, by conductor 141 to conductor 135 and thence to line L'. Thus when the motor circuit is closed the shunt field is insured maximum strength. Automatic operation of the accelerating switches following completion of the aforesaid circuits first short-circuits resistance $r$ and then short-circuits commutating field $f^2$ from conductor 130 by conductor 142 through accelerating switch 5, by conductor 143 to conductor 131. Then when the switch 6 is opened as above described, the shunt field current is forced to take a path from conductor 139 through rheostat 77, by conductors 144 and 145 through auxiliary switch 8 of reversing switch 1, by conductor 146 to conductor 135 and thence to line L'. The rheostat 77 thus determines the speed of the motor in the direction selected by switch 1.

Assume now that the controller is operated to close the reversing switch 2, then the motor circuit will be completed as already traced through the series field winding $f$ and resistance $r$, and thence by conductor 128 through the right hand arm of reversing switch 2, by conductor 133 through the interpole field winding $f^1$, armature $a$ and commutating field $f^2$, by conductors 130, 142 and 147, through resistance $r'$, by conductor 148 through the left hand arm of switch 2 to conductor 136 and thence to line L'. The shunt field circuit extends as already traced. In this instance it will be observed that both resistances $r$ and $r'$ are included in the motor circuit and in consequence as the switches 3, 4 and 5 operate they will progressively exclude the resistances $r$ and $r'$ and the commutating field $f^2$ and when switch 6 opens the circuit of the shunt field winding will extend from conductor 138 by conductor 149 to auxiliary switch 9 of reversing switch 2, by conductor 145 through rheostat 76, by conductors 150 and 141 to conductor 135 and thence to line L'. Thus in this direction of operation of the motor the speed is determined by the rheostat 76.

In practice, the two field rheostats would be adjusted for different speeds, namely a relatively slow speed for movement of the planer bed in a direction for performance of work and a relatively high speed for return movement of the planer bed. In consequence, it will be apparent that the motor must be reversed under different electrical conditions at the opposite limits of movement of the planer bed and it is to meet such conditions that the reversing switches are arranged to initially include different amounts of resistance in the motor circuit. As will be understood the resistances $r$ and $r'$ serve for plugging purposes upon reversals of the motor and more resistance will be required in reversing the motor when running at high speed than when running at low speed. Accordingly as the motor operates at maximum speed upon return movement more resistance will be required for reversing the motor for working operation, whereas a lesser amount of resistance will suffice for reversal of the motor from the latter direction, and assuming switch 2 to be employed for working operation of the planer bed and the switch 1 for return operation of the planer bed, this result will be accomplished. Switch 2, as above described, includes both resistances $r$ and $r'$ while switch 1 includes only resistance $r$.

The motor when in operation may be stopped at will by return of the master shaft to centered position, whereupon both reversing switches and all of the accelerating switches are opened while the field switch 6 is closed and the field switch 7 is opened. In consequence, the current flowing through the shunt field winding will be forced to take a path through both rheostats 76 and 77, with the result of economizing power, as above set forth.

If during operation of the motor there is a failure of voltage resulting in the deenergization of switch 114, a dynamic braking circuit will be established which will vary according to the reversing switch which happens to be closed at such time. If the switch 114 is deënergized while switch 1 is closed then the braking circuit may be traced from the right hand terminal of the motor armature $a$, by conductor 131 through the commutating field $f^2$, by conductor 130 through the right hand arm of switch 1, by conductors 129 and 128 through accelerating switch 3, by conductors 127 and 151 through the right hand arm of switch 114, by conductor 125 through the series field winding $f$, by conductor 126 through the left hand arm of switch 114, by conductor 152 through a dynamic braking resistance $r^3$, to conductor 136 by conductor 135 through the left hand arm of switch 1, by conductors 134 and 133 through the interpole field winding $f'$, by conductor 132 to the left hand terminal of the motor armature. With the switch 2 closed the braking circuit would extend from the right hand terminal of the motor armature through the commutating field to conductor 130 as already traced, thence by conductors 142 and 147 through accelerating switch 4, by conductor 148 through the left hand arm of switch 2, by conductor 136 through braking resistance $r^3$ to conductor 152, through the left hand arm of switch 114, the series winding $f$ and the right hand arm of switch 114, by conductors 151 and 127 through accelerating switch 3, by conductor 128 to and through the right hand arm of switch 2, by conductor 133 through the interpole field winding $f$ to the left hand terminal of the motor. Thus, upon tripping of switch 114, the motor will be quickly brought to rest and the motor circuit will be maintained open until return of the controller to off position to close the interlocking switch 10. This restores the accelerating switches to starting position and enables resetting of switch 114 by depression of the push-button switch 113, as above set forth.

The advantages of the special type of motor illustrated and the control thereof as described will be readily understood by those skilled in the art. Among such advantages may be mentioned the provision of a high starting torque and the provision for quick reversals of the motor.

Further, it will be understood that while the several switches directly control the various motor circuits, any or all of the same may be used to effect the desired results through the medium of electro-responsive switches governed thereby.

What I claim as new and desire to secure by Letters Patent is:

1. In a motor controller, in combination, reversing means, normally effective field weakening means and means associated with said reversing means for rendering said field weakening means ineffective during motor starting and thereafter effective to different degrees determinable by the setting of said reversing means.

2. In a motor controller, in combination, reversing means, separate field weakening devices under the control of said reversing means to be selectively rendered ineffective according to the setting of said means for motor operation and means to render both of said devices effective upon termination of motor operation.

3. In a motor controller, in combination, separate speed determining devices for reverse operations of the motor, common controlling means therefor and means controlling the direction of operation of the motor and limiting the controlling action of said means to said devices selectively in accordance with the direction of operation of the motor.

4. In a motor controller, in combination, means for controlling the direction of operation of the motor, separate speed determining devices for reverse operations of the motor, common means controlling both of said devices and means associated with said first-mentioned means to remove said devices selectively from the control of said common means.

5. In a motor controller, in combination, reversing switches, separate speed regulating devices, a common control switch for said devices tending when operated to render both effective and switches operable by said reversing switches to render said devices ineffective selectively.

6. In a motor controller, in combination, means controlling the continuity of the motor circuit, current reducing means for the shunt field of the motor, and a plurality of switches coöperating to render said second mentioned means ineffective upon completion of the motor circuit, one of said switches being associated with said first mentioned means to render said current reducing means effective upon interruption of the motor circuit and the other being operable during operation of the motor to render said current reducing means ineffective.

7. In a motor controller, in combination, means controlling the continuity of the motor circuit, means operating automatically following completion of the motor circuit and current reducing means for the shunt field of the motor jointly controlled by said first two mentioned means to be excluded from circuit upon initial completion of the motor circuit and independently controlled by said two means to be included in circuit for running and when the motor is idle.

8. In a motor controller, in combination, means for completing the motor circuit for operation in either direction and field weakening means having a controlling element associated with said former means, said element tending to render said field weakening means effective upon operation of said first mentioned means to interrupt the motor circuit but having a time element to permit reversals of the motor without effecting field weakening.

9. In a motor controller, in combination, means controlling the continuity of the motor circuit and varying the circuit connections for reverse operations of the motor, field weakening means, and means associated with said first mentioned means to render said field weakening means effective upon interruption of the motor circuit but having associated therewith means for delaying such tendency to enable reversals of the motor without field weakening.

10. In a motor controller, in combination, means controlling the continuity of the motor circuit and operable to vary the circuit connections for operation of the motor in opposite directions, field weakening means having a switch associated with said first mentioned means to render said field weakening means ineffective upon initial closure of the motor circuit and tending upon reversals of the motor to render said field weakening means effective and means associated with said switch for delaying the last mentioned action thereof to maintain a strengthened field for reversals.

11. In a motor controller, in combination, means controlling the continuity of circuit and direction of operation of the motor, separate field rheostats selectively controlled by said first mentioned means for reverse operations of the motor, and a common control switch for said rheostats associated with said first mentioned means to include said rheostats in circuit when the motor is idle and to temporarily exclude the same from circuit when the motor is started.

12. In a motor controller, in combination, means controlling the continuity of circuit and direction of operation of the motor, separate field rheostats selectively controlled by said first mentioned means for reverse operations of the motor, and a common control switch for said rheostats associated with said first mentioned means to include said rheostats in circuit when the motor is idle and to temporarily exclude the same from circuit when the motor is started, and a second common control switch for said rheostats operable to include the same in circuit after the motor is started subject to selection by said first mentioned means.

13. In a motor controller, in combination, means controlling the continuity of the motor circuit, automatic accelerating means operating upon completion of the motor circuit, field weakening means and two control switches therefor one associated with said first mentioned means and the other with said accelerating means, said switches coöperating to exclude said field weakening means from circuit upon initial closure of the motor circuit and acting independently to include said field weakening means for running and when the motor is idle.

14. In a motor controller, in combination, means controlling the continuity of circuit and direction of operation of the motor, automatic accelerating means operating upon completion of the motor circuit by said former means, means for weakening the field of the motor to different degrees subject to selection by said first mentioned means according to the direction of operation of the motor and control switches for said field weakening means one associated with said first mentioned means and the other with said accelerating means, said switches coöperating to exclude said field-weakening means upon initial closure of the motor circuit and acting independently to include said field weakening means for running and when the motor is idle.

15. In a motor controller, in combination, means for effecting operation of the motor in opposite directions, speed regulating means providing for reverse operations of the motor at different speeds and a single starting device coördinated with said first mentioned means including means arranged to compensate for the different electrical conditions obtaining upon successive reversals of the motor.

16. In a motor controller, in combination, means for effecting operation of the motor in opposite directions, a single starting device for the motor including a resistance for the circuit of the motor armature, said resistance being variable by said first mentioned means for plugging the motor upon reversals thereof.

17. In a motor controller, in combination, reversing switches, means for establishing different speeds for the motor upon reverse operations thereof, a plurality of sections of resistance for inclusion in the motor armature circuit and connections whereby one of said reversing switches completes the motor armature circuit to include all of said resistance sections and the other to include only a part thereof.

18. In a motor controller, in combination, means controlling the continuity of circuit and direction of operation of the motor, accelerating means, field weakening means, a plurality of control switches for said field weakening means and a common control member for said first two mentioned means and said control switches.

19. In a motor controller, in combination, separately operable reversing switches, a plurality of progressively operating accelerating switches having a common operating shaft and means for automatically turning said shaft in one direction, a master shaft controlling the operation of said reversing switches and said accelerating switches, a field regulator and two control switches therefor one associated with and operated by said master shaft and the other associated with and operated by the shaft of said accelerating switches.

20. The combination with a planer machine having a motor operated reciprocating bed, of a controller having reversing switches operated by the planer bed at the limits of its movement and having mechanically actuated accelerating means associated with and controlled by said reversing switches to operate automatically after the setting of said switches.

21. The combination with a planing machine having a reciprocating bed, of an operating motor therefor having series, commutating and shunt field windings and controlling means operated by said planer bed to effect operation of said motor in opposite directions and at different speeds according to the direction of operation of said planer bed, said controller having means for excluding from circuit the commutating field of said motor and for weakening the shunt field thereof.

In witness whereof, I have hereunto subscribed my name in the presence of two witnesses.

ARTHUR SIMON.

Witnesses:
TEKLA BAST,
L. A. WATSON.